(12) United States Patent
Lacapra et al.

(10) Patent No.: US 8,239,354 B2
(45) Date of Patent: Aug. 7, 2012

(54) SYSTEM AND METHOD FOR MANAGING SMALL-SIZE FILES IN AN AGGREGATED FILE SYSTEM

(75) Inventors: Francesco Lacapra, Sunnyvale, CA (US); Srinivas Duvvuri, Santa Clara, CA (US)

(73) Assignee: F5 Networks, Inc., Seattle, WA (US)

( * ) Notice: Subject to any disclaimer, the term of this patent is extended or adjusted under 35 U.S.C. 154(b) by 190 days.

(21) Appl. No.: 11/072,892

(22) Filed: Mar. 3, 2005

(65) Prior Publication Data

US 2006/0200470 A1 Sep. 7, 2006

(51) Int. Cl.
*G06F 17/30* (2006.01)
(52) U.S. Cl. .......................................... 707/694
(58) Field of Classification Search .................... 707/694
See application file for complete search history.

(56) References Cited

U.S. PATENT DOCUMENTS

| | | | |
|---|---|---|---|
| 4,993,030 A | | 2/1991 | Krakauer et al. |
| 5,218,695 A | | 6/1993 | Noveck et al. |
| 5,303,368 A | | 4/1994 | Kotaki |
| 5,473,362 A | | 12/1995 | Fitzgerald et al. |
| 5,511,177 A | | 4/1996 | Kagimasa et al. |
| 5,537,585 A | * | 7/1996 | Blickenstaff et al. .......... 707/205 |
| 5,548,724 A | | 8/1996 | Akizawa et al. |
| 5,550,965 A | * | 8/1996 | Gabbe et al. ................... 715/209 |
| 5,583,995 A | | 12/1996 | Gardner et al. |
| 5,586,260 A | | 12/1996 | Hu |
| 5,590,320 A | | 12/1996 | Maxey |
| 5,649,194 A | | 7/1997 | Miller et al. |
| 5,649,200 A | | 7/1997 | Leblang et al. |
| 5,668,943 A | | 9/1997 | Attanasio et al. |
| 5,692,180 A | | 11/1997 | Lee |
| 5,721,779 A | | 2/1998 | Funk |
| 5,724,512 A | | 3/1998 | Winterbottom |
| 5,806,061 A | * | 9/1998 | Chaudhuri et al. ................ 707/3 |
| 5,832,496 A | * | 11/1998 | Anand et al. ................... 707/102 |

(Continued)

FOREIGN PATENT DOCUMENTS

AU 2003300350 A1 7/2004

(Continued)

OTHER PUBLICATIONS

Cabera et al., "Swift: Using Distributed Disk Stripping to Provide High I/O Data Rates," *Computing Systems* (1991) 4:405-436.

(Continued)

*Primary Examiner* — Mark Andrew X Radtke
(74) *Attorney, Agent, or Firm* — LeClairRyan, a Professional Corporation

(57) ABSTRACT

In an aggregated file system, a method of processing a user file retrieves user file metadata and user data from a metadata server and applies operations to the user data in accordance with a file open request from a client. At the end of the process, the method stores the processed user data at a location in accordance with a predefined rule and updates the metadata in the metadata server to reference the processed user data at the location. In some embodiments, the predefined rule is to choose a location between the metadata server and a separate storage server in accordance with the size of the processed user data. If the size is still smaller than a predetermined threshold, the user data is stored in the metadata server. Otherwise, the user data is stored in the storage server.

22 Claims, 3 Drawing Sheets

U.S. PATENT DOCUMENTS

| | | | | |
|---|---|---|---|---|
| 5,832,522 A | * | 11/1998 | Blickenstaff et al. | 707/204 |
| 5,838,970 A | | 11/1998 | Thomas | |
| 5,862,325 A | * | 1/1999 | Reed et al. | 709/201 |
| 5,884,303 A | | 3/1999 | Brown | |
| 5,893,086 A | * | 4/1999 | Schmuck et al. | 707/1 |
| 5,897,638 A | | 4/1999 | Lasser et al. | |
| 5,905,990 A | | 5/1999 | Inglett | 707/200 |
| 5,917,998 A | | 6/1999 | Cabrera et al. | |
| 5,920,873 A | * | 7/1999 | Van Huben et al. | 707/202 |
| 5,937,406 A | | 8/1999 | Balabine et al. | |
| 5,999,664 A | * | 12/1999 | Mahoney et al. | 382/305 |
| 6,012,083 A | | 1/2000 | Savitzky et al. | 709/202 |
| 6,029,168 A | | 2/2000 | Frey | |
| 6,044,367 A | | 3/2000 | Wolff | |
| 6,047,129 A | | 4/2000 | Frye | |
| 6,072,942 A | * | 6/2000 | Stockwell et al. | 709/206 |
| 6,078,929 A | | 6/2000 | Rao | |
| 6,085,234 A | | 7/2000 | Pitts et al. | 709/217 |
| 6,088,694 A | * | 7/2000 | Burns et al. | 1/1 |
| 6,128,627 A | * | 10/2000 | Mattis et al. | 707/202 |
| 6,128,717 A | | 10/2000 | Harrison et al. | |
| 6,161,145 A | | 12/2000 | Bainbridge et al. | |
| 6,161,185 A | | 12/2000 | Guthrie et al. | |
| 6,181,336 B1 | | 1/2001 | Chiu et al. | 715/736 |
| 6,223,206 B1 | | 4/2001 | Dan et al. | |
| 6,233,648 B1 | * | 5/2001 | Tomita | 711/4 |
| 6,237,008 B1 | | 5/2001 | Beal et al. | |
| 6,256,031 B1 | | 7/2001 | Meijer et al. | |
| 6,282,610 B1 | | 8/2001 | Bergsten | |
| 6,289,345 B1 | * | 9/2001 | Yasue | 707/10 |
| 6,308,162 B1 | | 10/2001 | Ouimet et al. | |
| 6,324,581 B1 | | 11/2001 | Xu et al. | 709/229 |
| 6,339,785 B1 | | 1/2002 | Feigenbaum | |
| 6,349,343 B1 | | 2/2002 | Foody et al. | |
| 6,374,263 B1 | | 4/2002 | Bunger et al. | |
| 6,389,433 B1 | | 5/2002 | Bolosky et al. | |
| 6,393,581 B1 | | 5/2002 | Friedman et al. | |
| 6,397,246 B1 | | 5/2002 | Wolfe | |
| 6,412,004 B1 | * | 6/2002 | Chen et al. | 709/226 |
| 6,438,595 B1 | | 8/2002 | Blumenau et al. | |
| 6,477,544 B1 | | 11/2002 | Bolosky et al. | |
| 6,487,561 B1 | | 11/2002 | Ofek et al. | |
| 6,493,804 B1 | | 12/2002 | Soltis et al. | |
| 6,516,350 B1 | | 2/2003 | Lumelsky et al. | |
| 6,516,351 B2 | | 2/2003 | Borr | |
| 6,549,916 B1 | | 4/2003 | Sedlar | |
| 6,553,352 B2 | | 4/2003 | Delurgio et al. | |
| 6,556,997 B1 | | 4/2003 | Levy | |
| 6,556,998 B1 | * | 4/2003 | Mukherjee et al. | 707/10 |
| 6,601,101 B1 | | 7/2003 | Lee et al. | |
| 6,612,490 B1 | | 9/2003 | Herrendoerfer et al. | |
| 6,721,794 B2 | | 4/2004 | Taylor et al. | |
| 6,738,790 B1 | * | 5/2004 | Klein et al. | 1/1 |
| 6,742,035 B1 | | 5/2004 | Zayas et al. | 709/226 |
| 6,748,420 B1 | | 6/2004 | Quatrano et al. | |
| 6,757,706 B1 | | 6/2004 | Dong et al. | |
| 6,775,673 B2 | | 8/2004 | Mahalingam et al. | |
| 6,775,679 B2 | | 8/2004 | Gupta | 707/102 |
| 6,782,450 B2 | | 8/2004 | Arnott et al. | |
| 6,801,960 B1 | | 10/2004 | Ericson et al. | |
| 6,826,613 B1 | | 11/2004 | Wang et al. | |
| 6,839,761 B2 | | 1/2005 | Kadyk et al. | |
| 6,847,959 B1 | | 1/2005 | Arrouye et al. | |
| 6,847,970 B2 | | 1/2005 | Keller et al. | 707/100 |
| 6,850,997 B1 | | 2/2005 | Rooney et al. | |
| 6,889,249 B2 | | 5/2005 | Miloushev et al. | |
| 6,922,688 B1 | | 7/2005 | Frey, Jr. | |
| 6,934,706 B1 | | 8/2005 | Mancuso et al. | |
| 6,938,039 B1 | | 8/2005 | Bober et al. | |
| 6,938,059 B2 | | 8/2005 | Tamer et al. | |
| 6,959,373 B2 | | 10/2005 | Testardi | |
| 6,961,815 B2 | | 11/2005 | Kistler et al. | |
| 6,973,455 B1 | | 12/2005 | Vahalia et al. | |
| 6,973,549 B1 | | 12/2005 | Testardi | |
| 6,985,936 B2 | | 1/2006 | Agarwalla et al. | |
| 6,985,956 B2 | * | 1/2006 | Luke et al. | 709/229 |
| 6,986,015 B2 | | 1/2006 | Testardi | |
| 6,990,547 B2 | * | 1/2006 | Ulrich et al. | 710/304 |
| 6,990,667 B2 | * | 1/2006 | Ulrich et al. | 718/105 |
| 6,996,841 B2 | | 2/2006 | Kadyk et al. | |
| 7,010,553 B2 | | 3/2006 | Chen et al. | |
| 7,013,379 B1 | | 3/2006 | Testardi | |
| 7,051,112 B2 | | 5/2006 | Dawson | |
| 7,072,917 B2 | | 7/2006 | Wong et al. | |
| 7,089,286 B1 | * | 8/2006 | Malik | 709/206 |
| 7,111,115 B2 | | 9/2006 | Peters et al. | |
| 7,113,962 B1 | | 9/2006 | Kee et al. | |
| 7,120,746 B2 | | 10/2006 | Campbell et al. | |
| 7,127,556 B2 | | 10/2006 | Blumenau et al. | |
| 7,133,967 B2 | | 11/2006 | Fujie et al. | |
| 7,146,524 B2 | | 12/2006 | Patel et al. | 714/6 |
| 7,152,184 B2 | | 12/2006 | Maeda et al. | |
| 7,155,466 B2 | | 12/2006 | Rodriguez et al. | |
| 7,165,095 B2 | | 1/2007 | Sim | |
| 7,167,821 B2 | | 1/2007 | Hardwick et al. | |
| 7,173,929 B1 | | 2/2007 | Testardi | |
| 7,194,579 B2 | | 3/2007 | Robinson et al. | 711/114 |
| 7,234,074 B2 | | 6/2007 | Cohn et al. | |
| 7,280,536 B2 | | 10/2007 | Testardi | |
| 7,284,150 B2 | | 10/2007 | Ma et al. | 714/6 |
| 7,293,097 B2 | | 11/2007 | Borr | |
| 7,293,099 B1 | | 11/2007 | Kalajan | |
| 7,293,133 B1 | | 11/2007 | Colgrove et al. | |
| 7,346,664 B2 | | 3/2008 | Wong et al. | |
| 7,383,288 B2 | | 6/2008 | Miloushev et al. | |
| 7,401,220 B2 | | 7/2008 | Bolosky et al. | |
| 7,406,484 B1 | | 7/2008 | Srinivasan et al. | |
| 7,415,488 B1 | | 8/2008 | Muth et al. | |
| 7,415,608 B2 | | 8/2008 | Bolosky et al. | |
| 7,440,982 B2 | | 10/2008 | Lu et al. | |
| 7,475,241 B2 | | 1/2009 | Patel et al. | |
| 7,477,796 B2 | * | 1/2009 | Sasaki et al. | 382/248 |
| 7,509,322 B2 | | 3/2009 | Miloushev et al. | |
| 7,512,673 B2 | | 3/2009 | Miloushev et al. | |
| 7,519,813 B1 | | 4/2009 | Cox et al. | |
| 7,562,110 B2 | | 7/2009 | Miloushev et al. | |
| 7,571,168 B2 | | 8/2009 | Bahar et al. | |
| 7,574,433 B2 | | 8/2009 | Engel | |
| 7,599,941 B2 | | 10/2009 | Bahar et al. | |
| 7,610,307 B2 | | 10/2009 | Havewala et al. | |
| 7,624,109 B2 | | 11/2009 | Testardi | |
| 7,639,883 B2 | * | 12/2009 | Gill | 382/232 |
| 7,653,699 B1 | | 1/2010 | Colgrove et al. | |
| 7,734,603 B1 | | 6/2010 | McManis | |
| 7,788,335 B2 | | 8/2010 | Miloushev et al. | |
| 7,822,939 B1 | | 10/2010 | Veprinsky et al. | |
| 7,831,639 B1 | | 11/2010 | Panchbudhe et al. | |
| 7,870,154 B2 | | 1/2011 | Shitomi et al. | |
| 7,877,511 B1 | | 1/2011 | Berger et al. | |
| 7,885,970 B2 | | 2/2011 | Lacapra | |
| 7,913,053 B1 | * | 3/2011 | Newland | 711/172 |
| 7,953,701 B2 | * | 5/2011 | Okitsu et al. | 707/620 |
| 7,958,347 B1 | | 6/2011 | Ferguson | |
| 8,005,953 B2 | | 8/2011 | Miloushev et al. | |
| 2001/0014891 A1 | | 8/2001 | Hoffert et al. | |
| 2001/0047293 A1 | | 11/2001 | Waller et al. | |
| 2001/0051955 A1 | | 12/2001 | Wong | |
| 2002/0035537 A1 | | 3/2002 | Waller et al. | |
| 2002/0059263 A1 | | 5/2002 | Shima et al. | |
| 2002/0065810 A1 | | 5/2002 | Bradley | |
| 2002/0073105 A1 | | 6/2002 | Noguchi et al. | |
| 2002/0083118 A1 | | 6/2002 | Sim | |
| 2002/0120763 A1 | * | 8/2002 | Miloushev et al. | 709/230 |
| 2002/0133330 A1 | | 9/2002 | Loisey et al. | |
| 2002/0133491 A1 | | 9/2002 | Sim et al. | |
| 2002/0138502 A1 | | 9/2002 | Gupta | |
| 2002/0147630 A1 | | 10/2002 | Rose et al. | |
| 2002/0150253 A1 | | 10/2002 | Brezak et al. | |
| 2002/0161911 A1 | * | 10/2002 | Pinckney et al. | 709/231 |
| 2002/0188667 A1 | | 12/2002 | Kirnos | |
| 2003/0009429 A1 | | 1/2003 | Jameson | 706/45 |
| 2003/0028514 A1 | * | 2/2003 | Lord et al. | 707/1 |
| 2003/0033308 A1 | * | 2/2003 | Patel et al. | 707/10 |
| 2003/0033535 A1 | | 2/2003 | Fisher et al. | |
| 2003/0061240 A1 | | 3/2003 | McCann et al. | |
| 2003/0115218 A1 | | 6/2003 | Bobbitt et al. | |
| 2003/0115439 A1 | | 6/2003 | Mahalingam et al. | |

| | | | | | | |
|---|---|---|---|---|---|---|
| 2003/0135514 A1* | 7/2003 | Patel et al. ............... 707/102 | | 2009/0041230 A1 | 2/2009 | Williams |
| 2003/0149781 A1 | 8/2003 | Yared et al. | | 2009/0055607 A1 | 2/2009 | Schack et al. |
| 2003/0159072 A1 | 8/2003 | Bellinger et al. | | 2009/0077097 A1 | 3/2009 | Lacapra et al. |
| 2003/0171978 A1 | 9/2003 | Jenkins et al. | | 2009/0089344 A1 | 4/2009 | Brown et al. |
| 2003/0177388 A1 | 9/2003 | Botz et al. | | 2009/0094252 A1 | 4/2009 | Wong et al. |
| 2003/0204635 A1 | 10/2003 | Ko et al. | | 2009/0106255 A1 | 4/2009 | Lacapra et al. |
| 2004/0003266 A1 | 1/2004 | Moshir et al. | | 2009/0106263 A1 | 4/2009 | Khalid et al. |
| 2004/0006575 A1* | 1/2004 | Visharam et al. .......... 707/104.1 | | 2009/0132616 A1 | 5/2009 | Winter et al. |
| 2004/0010654 A1 | 1/2004 | Yasuda et al. | | 2009/0204649 A1 | 8/2009 | Wong et al. |
| 2004/0025013 A1 | 2/2004 | Parker et al. | | 2009/0204650 A1 | 8/2009 | Wong et al. |
| 2004/0028043 A1 | 2/2004 | Maveli et al. | | 2009/0204705 A1 | 8/2009 | Marinov et al. |
| 2004/0028063 A1 | 2/2004 | Roy et al. | | 2009/0210431 A1 | 8/2009 | Marinkovic et al. |
| 2004/0030857 A1 | 2/2004 | Krakirian et al. | | 2009/0254592 A1 | 10/2009 | Marinov et al. |
| 2004/0054777 A1 | 3/2004 | Ackaouy et al. | | 2010/0077294 A1 | 3/2010 | Watson |
| 2004/0093474 A1 | 5/2004 | Lin et al. | | 2010/0211547 A1 | 8/2010 | Kamei et al. |
| 2004/0098383 A1* | 5/2004 | Tabellion et al. ................ 707/3 | | 2011/0087696 A1 | 4/2011 | Lacapra |
| 2004/0133573 A1 | 7/2004 | Miloushev et al. | | | | |
| 2004/0133577 A1* | 7/2004 | Miloushev et al. .............. 707/10 | | FOREIGN PATENT DOCUMENTS | | |
| 2004/0133606 A1 | 7/2004 | Miloushev et al. | | CA | 2512312 A1 | 7/2004 |
| 2004/0133607 A1* | 7/2004 | Miloushev et al. .......... 707/200 | | EP | 0 738 970 | 10/1996 |
| 2004/0133650 A1 | 7/2004 | Miloushev et al. | | JP | 63010250 A | 1/1988 |
| 2004/0139355 A1 | 7/2004 | Axel et al. | | JP | 06-332782 | 12/1994 |
| 2004/0148380 A1 | 7/2004 | Meyer et al. | | JP | 08-328760 | 12/1996 |
| 2004/0153479 A1 | 8/2004 | Mikesell et al. | | JP | 08-339355 | 12/1996 |
| 2004/0181605 A1 | 9/2004 | Nakatani et al. | | JP | 9016510 A | 1/1997 |
| 2004/0199547 A1 | 10/2004 | Winter et al. | | JP | 11282741 A1 | 10/1999 |
| 2004/0236798 A1* | 11/2004 | Srinivasan et al. ........... 707/200 | | WO | WO 02/056181 A2 | 7/2002 |
| 2004/0267830 A1 | 12/2004 | Wong et al. | | WO | WO 2004/061605 A2 | 7/2004 |
| 2005/0021615 A1 | 1/2005 | Arnott et al. | | WO | WO 2008/130983 A1 | 10/2008 |
| 2005/0050107 A1 | 3/2005 | Mane et al. ................... 707/200 | | WO | WO 2008/147973 A2 | 12/2008 |
| 2005/0091214 A1 | 4/2005 | Probert et al. | | | | |
| 2005/0108575 A1 | 5/2005 | Yung | | OTHER PUBLICATIONS | | |
| 2005/0114291 A1 | 5/2005 | Becker-Szendy et al. | | | | |
| 2005/0187866 A1 | 8/2005 | Lee | | | | |
| 2005/0246393 A1 | 11/2005 | Coates et al. | | | | |
| 2005/0289109 A1 | 12/2005 | Arrouye et al. | | | | |
| 2005/0289111 A1 | 12/2005 | Tribble et al. | | | | |
| 2006/0010502 A1 | 1/2006 | Mimatsu et al. | | | | |
| 2006/0075475 A1 | 4/2006 | Boulos et al. | | | | |
| 2006/0080353 A1 | 4/2006 | Miloushev et al. | | | | |
| 2006/0106882 A1 | 5/2006 | Douceur et al. | | | | |
| 2006/0112151 A1 | 5/2006 | Manley et al. | | | | |
| 2006/0123062 A1 | 6/2006 | Bobbitt et al. | | | | |
| 2006/0161518 A1 | 7/2006 | Lacapra ............................. 707/2 | | | | |
| 2006/0167838 A1 | 7/2006 | Lacapra ............................. 707/2 | | | | |
| 2006/0179261 A1 | 8/2006 | Rajan | | | | |
| 2006/0184589 A1 | 8/2006 | Lees et al. | | | | |
| 2006/0190496 A1 | 8/2006 | Tsunoda | | | | |
| 2006/0200470 A1 | 9/2006 | Lacapra et al. | | | | |
| 2006/0212746 A1 | 9/2006 | Amegadzie et al. | | | | |
| 2006/0224687 A1 | 10/2006 | Popkin et al. | | | | |
| 2006/0230265 A1 | 10/2006 | Krishna | | | | |
| 2006/0242179 A1 | 10/2006 | Chen et al. | | | | |
| 2006/0259949 A1 | 11/2006 | Schaefer et al. | | | | |
| 2006/0271598 A1 | 11/2006 | Wong et al. | | | | |
| 2006/0277225 A1 | 12/2006 | Mark et al. | | | | |
| 2006/0282461 A1 | 12/2006 | Marinescu | | | | |
| 2006/0282471 A1 | 12/2006 | Mark et al. | | | | |
| 2007/0022121 A1 | 1/2007 | Bahar et al. | | | | |
| 2007/0024919 A1 | 2/2007 | Wong et al. | | | | |
| 2007/0027929 A1 | 2/2007 | Whelan | | | | |
| 2007/0027935 A1 | 2/2007 | Haselton et al. | | | | |
| 2007/0028068 A1 | 2/2007 | Golding et al. | | | | |
| 2007/0088702 A1 | 4/2007 | Fridella et al. | | | | |
| 2007/0098284 A1* | 5/2007 | Sasaki et al. ................... 382/239 | | | | |
| 2007/0136308 A1 | 6/2007 | Tsirigotis et al. | | | | |
| 2007/0208748 A1 | 9/2007 | Li | | | | |
| 2007/0209075 A1 | 9/2007 | Coffman | | | | |
| 2007/0226331 A1 | 9/2007 | Srinivasan et al. | | | | |
| 2008/0046432 A1 | 2/2008 | Anderson et al. | | | | |
| 2008/0070575 A1 | 3/2008 | Claussen et al. | | | | |
| 2008/0104443 A1 | 5/2008 | Akutsu et al. | | | | |
| 2008/0208933 A1 | 8/2008 | Lyon | | | | |
| 2008/0209073 A1* | 8/2008 | Tang ............................. 709/247 | | | | |
| 2008/0222223 A1 | 9/2008 | Srinivasan et al. | | | | |
| 2008/0243769 A1 | 10/2008 | Arbour et al. | | | | |
| 2008/0282047 A1 | 11/2008 | Arakawa et al. | | | | |
| 2009/0007162 A1 | 1/2009 | Sheehan | | | | |
| 2009/0037975 A1 | 2/2009 | Ishikawa et al. | | | | |

Noghani et al., "A Novel Approach to Reduce Latency on the Internet: 'Component-Based Download'," Proceedings of the Int'l Conf. on Internet Computing, Las Vegas, NV, Jun. 2000, pp. 1-6.

Fan, et al., "Summary Cache: A Scalable Wide-Area Web Cache Sharing Protocol," Computer Communications Review, Association for Computer Machinery, New York, Oct. 1998, vol. 28, No. 4, pp. 254, 265.

Rodriquez, et al., "Parallel-Access for Mirrow Sites in the Internet," IEEE Infocom 2000, Mar. 26, 2000, pp. 864-873.

U.S. Appl. No. 10/043,413, filed Jan. 10, 2002, File Switch and Switched File System, Vladimir Miloushev, Peter Nickolov.

U.S. Appl. No. 10/336,704, filed Jan. 2, 2003, Transaction Aggregation in a Switched File System, Vladimir Miloushev, Peter Nickolov.

U.S. Appl. No. 10/336,833, filed Jan. 2, 2003, Directory Aggregation for Files Distributed Over a Plurality of Servers in a Switched File System, Vladimir Miloushev, Peter Nickolov.

U.S. Appl. No. 10/336,835, filed Jan. 2, 2003, Metadata Based File Switch and Switched File System, Vladimir Miloushev, Peter Nickolov.

U.S. Appl. No. 10/336,832, filed Jan. 2, 2003, Rule Based Aggregation of Files and Transactions in a Switched File System, Vladimir Miloushev, Peter Nickolov.

U.S. Appl. No. 10/336,834, filed Jan. 2, 2003, Aggregated Lock Management for Locking Aggregate Files in a Switched File System, Vladimir Miloushev, Peter Nicolov.

U.S. Appl. No. 10/336,784, filed Jan. 2, 2003, Aggregated Opportunistic Lock and Aggregated Implicit Lock Management for Locking Aggregated Files in a Switched File System, Vladimir Miloushev, Peter Nickolov.

U.S. Appl. No. 11/337,190, filed Jan. 20, 2006, Scalable System for Partitioning and Accessing Metadata Over Multiple Servers, Francesco Lacapra.

U.S. Appl. No. 11/041,147, filed Jan. 21, 2005, File-based Hybrid File Storage Scheme Supporting Multiple File Switches, Francesco Lacapra.

U.S. Appl. No. 11/072,892, filed Mar. 3, 2005, System and Method for Managing Small-Size Files in an Aggregated File System, Francesco Lacapra, Srinivas Duvvuri.

U.S. Appl. No. 11/285,677, filed Nov. 21, 2005, Directory Aggregation for Files Distributed Over a Plurality of Servers in a Switched File System, Vladimir Miloushev, Peter Nickolov.

U.S. Appl. No. 11/724,107, filed Mar. 14, 2007, Transaction aggregation in a switched file system, Vladimir Miloushev, Peter Nickolov.

Basney, Jim et al., "Credential Wallets: A Classification of Credential Repositories Highlighting MyProxy," TPRC 2003, Sep. 19-21, 2003.

Botzum, Keys, "Single Sign On—A Contrarian View," Open Group Website, <http://www.opengroup.org/security/topics.htm>, Aug. 6, 2001, pp. 1-8.

Novotny, Jason et al., "An Online Credential Repository for the Grid: MyProxy," 2001, pp. 1-8.

Pashalidis, Andreas et al., "A Taxonomy of Single Sign-On Systems," 2003, pp. 1-16, Royal Holloway, University of London, Egham Surray, TW20, 0EX, United Kingdom.

Pashalidis, Andreas et al., "Impostor: a single sign-on system for use from untrusted devices," Global Telecommunications Conference, 2004, Globecom '04, IEEE, Issue Date: Nov. 29-Dec. 3, 2004, Royal Holloway, University of London.

Tulloch, Mitch, "Microsoft Encyclopedia of Security," pp. 218, 300-301, Microsoft Press, 2003, Redmond, Washington.

Aguilera, Marcos K. et al., "Improving recoverability in multi-tier storage systems", International Conference on Dependable Systems and Networks (DSN-2007), Edinburgh, Scotland, Jun. 2007, 10 pages.

Anderson, Darrell C. et al., "Interposed Request Routing for Scalable Network Storage", ACM Transactions on Computer Systems 20(1): (Feb. 2002), pp. 1-24.

Anderson et al., "Serverless Network File System", in the 15th Symposium on Operating Systems Principles, Dec. 1995, Association for Computing Machinery, Inc.

Anonymous, "How DFS Works: Remote File Systems", Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc. "Mac OS X Tiger Keynote Intro. Part 2" Jun. 2004, www.youtube.com <http://www.youtube.com/watch?v=zSBJwEmR.JbY>, p. 1.

Apple, Inc., "Tiger Developer Overview Series: Working with Spotlight", Nov. 23, 2004, www.apple.com using www.archive.org <http://web.archive.org/web/20041123005335/developer.apple.com/macosx/tiger/sp otlight.html>, pp. 1-6.

Auspex, "A Storage Architecture Guide", Second Edition, 2001, Auspex Systems, Inc., www.auspex.com, last accessed on Dec. 30, 2002.

Cabrera et al. "Swift: Storage Architecture for Large Objects", In Proceedings of the—Eleventh IEEE Symposium on Mass Storage Systems, pp. 123-128, Oct 1991.

Cabrera et al., "Using Data Striping in a Local Area Network", 1992, technical report No. UCSC-CRL-92-09 of the Computer & Information Sciences Department of University of California at Santa. Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters", in Proceedings of the Extreme Linux Track: 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003", Microsoft Corporation, Nov. 2002.

"CSA Persistent File System Technology", Colorado Software Architecture, Inc. White Paper, Jan. 1, 1999, p. 1-3, <http://www.cosoa.com/white_papers/pfs.php>.

"Distributed File System: Logical View of Physical Storage", White Paper, 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

English Translation of Notification of Reason(s) for Refusal for JP 2002-556371 (Dispatch Date: Jan. 22, 2007).

Farley, M., "Building Storage Networks", Jan. 2000, McGraw Hill, ISBN 0072120509.

Gibson et al., "File Server Scaling with Network-Attached Secure Disks", in Proceedings of the ACM International Conference on Measurement and Modeling of Computer Systems (Sigmetrics '97), Jun. 15-18, 1997, Association for Computing Machinery, Inc.

Gibson et al., "NASD Scalable Storage Systems", Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System", 1994, Ph.D. dissertation submitted in the Graduate Division of the University of California at Berkeley.

Harkin et al., "The Tiger Shark File System", 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space", IEEE Concurrency, pp. 60-69, Jan.-Mar. 1999.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report from International Application No. PCT/US03/41202, mailed Sep. 15, 2005.

International Search Report for International Patent Application No. PCT/US02/00720, Jul. 8, 2004.

Karamanolis, C. et al., "An Architecture for Scalable and Manageable File Services", Al., HPL-2001-173, Jul. 26, 2001. p. 1-114.

Katsurashima, W. et al., "NAS Switch: a Novel CIFS Server Virtualization", Proceedings. 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers", 13th LISA Conf., 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., Response filed by Japanese associate to office action dated Jan. 22, 2007 in corresponding Japanese patent application No. 2002-556371.

Klayman, J., Jul. 18, 2007 e-mail to Japanese associate including instructions for response to office action dated 1/22/07 in corresponding Japanese patent application No. 2002-556371.

Klayman, J., Response filed Mar. 20, 2008 to Final Office action dated Sep. 21, 2007 for related U.S. Appl. No. 10/336,784.

Kohl et al., "The Kerberos Network Authentication Service (V5)", RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects", Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, vol. 7, pp. 333-359, Summer 1994.

"NERSC Tutorials: I/O on the Cray T3E", chapter 8, "Disk Striping", National Energy Research Scientific Computing Center (NERSC), http://hpcfnersc.gov, last accessed on Dec. 27, 2002.

Norton et al., "CIFS Protocol Version CIFS-Spec 0.9", 2001, Storage Networking Industry Association (SNIA), www.snia.org, last accessed on Mar. 26, 2001.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings", Comm. of the ACM, vol. 33, No. 6, Jun. 1990.

Peterson, M., "Introducing Storage Area Networks", Feb. 1998, InfoStor, www.infostor.com, last accessed on Dec. 20, 2002.

Preslan et al., "Scalability and Failure Recovery in a Linux Cluster File System", in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

RSYNC, "Welcome to the RSYNC Web Pages", Retrieved from the Internet URL: http://samba.anu.edu.ut.rsync/. (Retrieved on Dec. 18, 2009).

Saunders, S., Response filed Jul. 6, 2007 to Office action dated Feb. 6, 2007 for related U.S. Appl. No. 10/336,784.

Savage, et al., "AFRAID—A Frequently Redundant Array of Independent Disks", 1996 USENIX Technical Conf., San Diego, California, Jan. 22-26, 1996.

"Scaling Next Generation Web Infrastructure with Content-Intelligent Switching", White Paper, Apr. 2000, p. 1-9 Alteon Web Systems, Inc.

Soltis et al., "The Design and Performance of a Shared Disk File System for IRIX", in Sixth NASA Goddard Space Flight Center Conference on Mass Storage and Technologies in cooperation with the Fifteenth IEEE Symposium on Mass Storage Systems. Mar. 23-26, 1998.

Soltis, et al., "The Global File System", in Proceedings of the Fifth NASA Goddard Space Flight Center Conference on Mass Storage Systems and Technologies, Sep. 17-19, 1996, College Park, Maryland.

Sorenson, K.M., "Installation and Administration: Kimberlite Cluster Version 1.1.0", Rev. Dec. 2000, Mission Critical Linux, http://oss.missioncriticallinux.corn/kimberlite/kimberlite.pdf.

Stakutis, C., "Benefits of SAN-based file system sharing", Jul. 2000, InfoStor, www.infostor.com, last accessed on Dec. 30, 2002.

"The AFS File System in Distributed Computing Environment", wwww.transarc.ibm.com/Library/whitepapers/AFS/afsoverview.html, last accessed on Dec. 20, 2002.

Thekkath et al., "Frangipani: A Scalable Distributed File System", in Proceedings of the 16th ACM Symposium on Operating Systems Principles, Oct. 1997, Association for Computing Machinery, Inc.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments", Sep. 2001, VERITAS Software Corp.

Wilkes, J., et al., "The HP AutoRAID Hierarchical Storage System", ACM Transactions on Computer Systems, vol. 14, No. 1, Feb. 1996.

"Windows Clustering Technologies—An Overview", Nov. 2001, Microsoft Corp., www.microsoft.com, last accessed on Dec. 30, 2002.

Zayas, E., "AFS-3 Programmer's Reference: Architectural Overview", Transarc Corp., version 1.0 of Sep. 2, 1991, doc. No. FS-00-D160.

* cited by examiner

SYSTEM AND METHOD FOR MANAGING SMALL-SIZE FILES IN AN AGGREGATED FILE SYSTEM

RELATED APPLICATIONS

This application is related to U.S. patent application Ser. No. 10/043,413, entitled FILE SWITCH AND SWITCHED FILE SYSTEM, filed Jan. 10, 2002, and U.S. Provisional Patent Application No. 60/261,153, entitled FILE SWITCH AND SWITCHED FILE SYSTEM and filed Jan. 11, 2001, both of which are incorporated herein by reference.

FIELD OF THE INVENTION

The present invention relates generally to the field of network associated storage, and more specifically to systems and methods for managing small-size files in an aggregated file system.

BACKGROUND

An aggregated file system is typically used for hosting a large number of user files. Each user file includes two distinct portions, user data and metadata. User data is the actual data of a user file that is requested and processed by a client, while metadata is information characterizing the properties and state of the user data, e.g., its location in the file system. When a file switch receives a file open request for the user file, it first retrieves the metadata from a metadata server that is part of the file system. Based on the metadata, the file switch then retrieves different stripes of the user data from one or more storage servers in response to a subsequent file read/write request and applies operations to them accordingly. At the end of the process, the metadata and user data stripes are stored back in their respective hosting metadata server and storage servers.

When a user file includes a large number of user data stripes, this scheme can improve the throughput of the aggregated file system. However, when the user file is small, e.g., including only a single data stripe, this scheme has a serious impact on the performance of the system. One reason is that even in this case the scheme requires at least two round-trip visits, one from the file switch to a metadata server and the other from the file switch to a storage server. Therefore, there is a need for a more efficient scheme for managing small-size user files in an aggregated file system.

SUMMARY

A method of processing a user file retrieves user file metadata and user data from a metadata server and applies operations to the user data in accordance with a file open request from a client. At the end of the process, the method stores the processed user data at a location in accordance with a predefined rule and updates the metadata in the metadata server to reference the processed user data at the location. In some embodiments, the predefined rule is to choose a location between the metadata server and a separate storage server in accordance with the size of the processed user data. If the size is smaller than a predetermined threshold, the user data is stored in the metadata server. Otherwise, the user data is stored in the storage server.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings.

Like reference numerals refer to corresponding parts throughout the several views of the drawings.

DESCRIPTION OF EMBODIMENTS

Definitions

User File. A "user file" is a file that a client computer works with (e.g., to read, write, or modify the file's contents). A user file may be divided into data stripes and stored in multiple storage servers of an aggregated file system.

Stripe. In the context of a file switch, a "stripe" is a portion of a user file having a fixed size. In some cases, an entire user file will be contained in a single stripe. But if the file being striped is larger than the stripe size, the file will be split into two or more stripes.

Metadata File. In the context of a file switch, a "metadata file" is a file that contains the metadata of a user file and is stored in a designated metadata server. While an ordinary client may not directly access the content of a metadata file by issuing read or write commands, it nonetheless has indirect access to certain metadata information stored therein, such as file layout, file length, etc.

File Switch. A "file switch" is a device performing various file operations in accordance with client instructions. The file switch is logically positioned between a client computer and a set of servers. To the client computer, the file switch appears to be a file storage device having enormous storage capacities and high throughput. To the servers, the file switch appears to be a client computer. The file switch directs the storage of individual user files over the servers, using striping and mirroring techniques to improve the system's throughput and fault tolerance.

Overview

Figure 1:
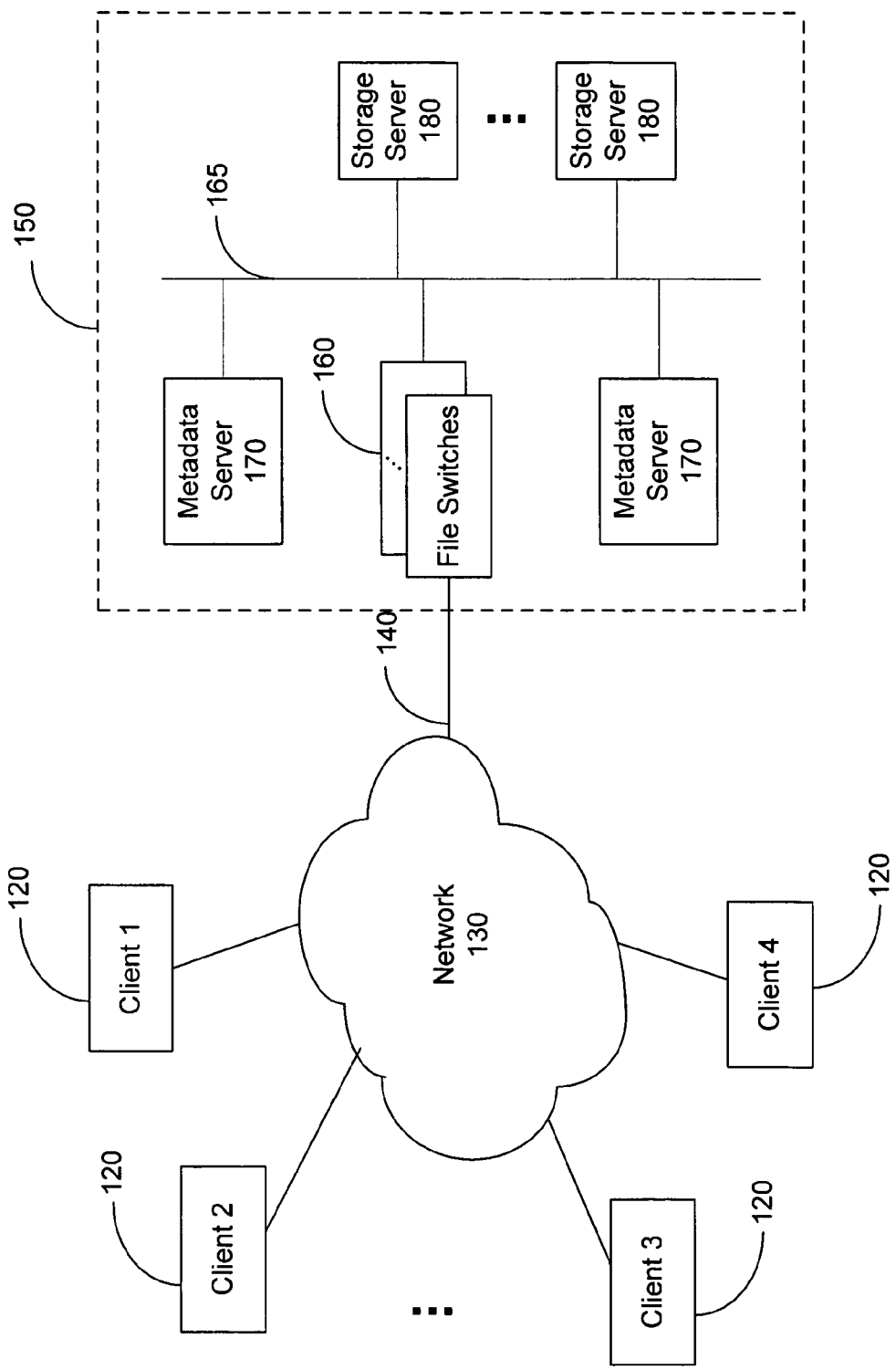
FIG. 1 is a diagram illustrating an exemplary network environment including an aggregated file system according to some embodiments of the present invention.

FIG. 1 illustrates an exemplary network environment including a plurality of clients 120, an aggregated file system 150 and a network 130. The network 130 may include the Internet, other wide area networks, local area networks, metropolitan area networks, wireless networks, and the like, or any combination thereof. A client 120 can be a personal computer, a personal digital assistant, a mobile phone, or any equivalents capable of connecting to the network 130. To access a particular user file, a client 120 typically submits one or more file access requests to the aggregated file system 150 through the network 130. The aggregated file system 150, in response, applies certain operations to the requested user file to satisfy the requests.

The aggregated file system 150 includes a group of storage servers 180, one or more metadata servers 170 and a group of file switches 160 having communication channels 165 with the storage servers 180 and the metadata servers 170, respectively. The aggregated file system 150 manages a large number of user files, each one having a unique file name. The aggregated file system 150 may be used to store many types of user files, including user files for storing data (e.g., database files, music files, MPEGs, videos, etc) and user files that contain applications and programs used by computer users, etc. These user files may range in size from a few bytes to multiple terabytes. Different types of user files may have dramatically distinct client access rates. For example, some files may be accessed very frequently (e.g., more than 50 times per hour on average, with peak access rates of over 100 times per hour) and others may be requested infrequently (e.g., less than once per day on average).

In some embodiments, a user file is typically split into a plurality of data stripes, each data stripe further including multiple stripe fragments with each fragment stored at one of the storage servers 180. The metadata of the user file is stored in a metadata server 170. As mentioned above, this storage scheme is desired for increasing the throughput of the aggregated file system 150, especially when processing an operation associated with a user file having a large amount of user data.

This storage scheme, however, requires a file switch to complete at least two transactions even when accessing a small user file that has only one user data stripe fragment. In particular, the file switch performs a first transaction to retrieve metadata from a metadata server, the metadata including such as information about the identity of a storage server hosting the user data stripe fragment. Second, the file switch performs a second transaction to retrieve the user data stripe fragment from the hosting storage server.

According to some embodiments, to improve the throughput of the file system when dealing with a small-size user file, the user data and metadata of the user file are no longer stored on two different servers. Instead, the user data resides on the same metadata server where the metadata is located. Further, a single access to the metadata server retrieves both the metadata and the user data to the requesting client and, as a result, the file access overhead is significantly reduced.

Process

Figure 2:
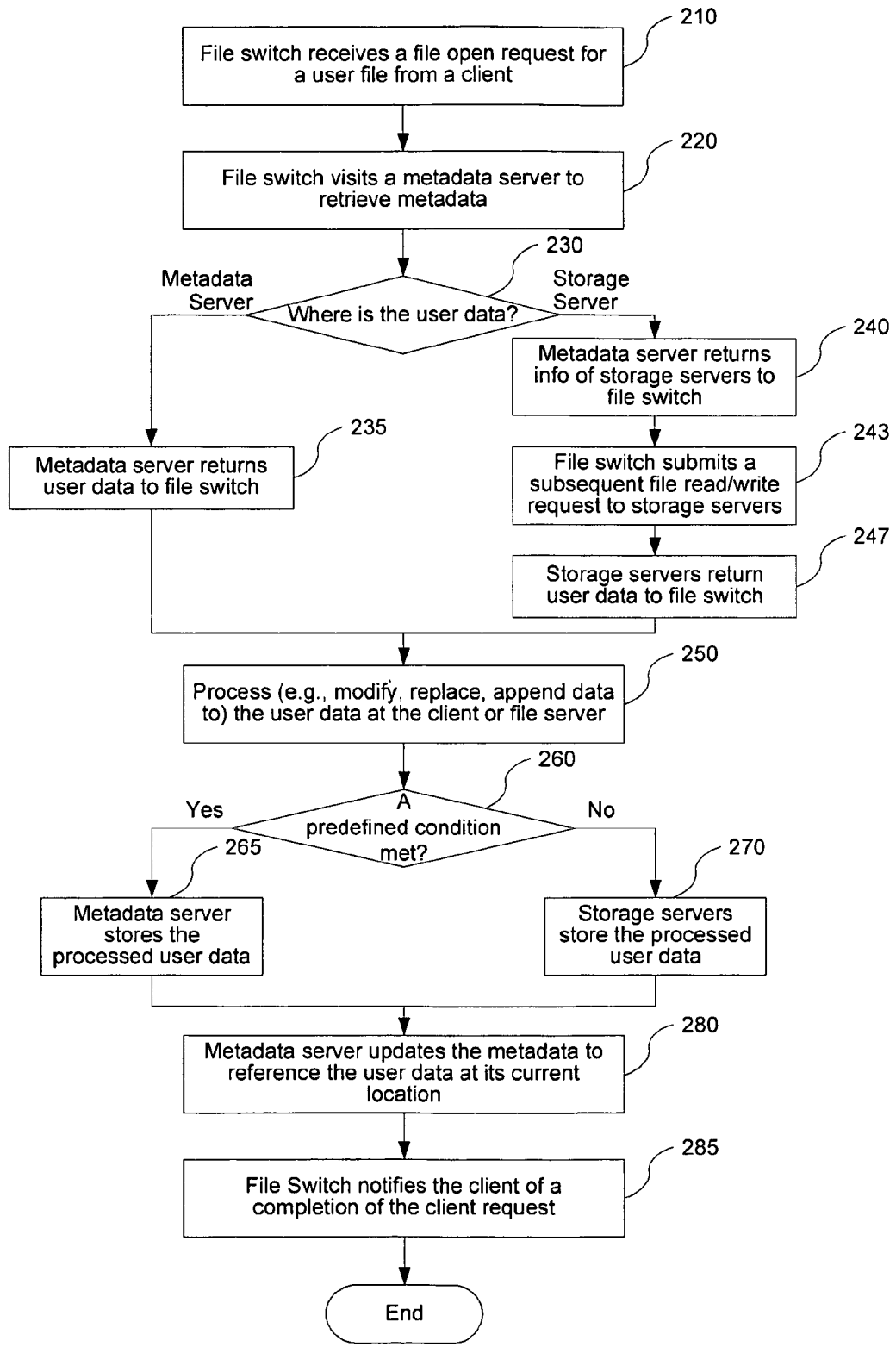
FIG. 2 is a flowchart illustrating how an aggregated file system operates in response to a file open request for a small-size user file according to some embodiments of the present invention.

FIG. 2 is a flowchart illustrating how an aggregated file system operates in response to a file open request for a small-size user file according to some embodiments of the present invention.

Upon receipt of a file open request for a user file from a client (210), a file switch visits a metadata server to retrieve metadata associated with the user file (220). The metadata includes information about the location of user data associated with the user file and the size of the user data. In some embodiments, if the size of the user data for a particular user file is smaller than a predetermined threshold (e.g., 8KB), the user data is stored in the same metadata server where the metadata is found. Otherwise, the user data is stored in one or more of the storage servers.

Therefore, in the case that the size of the user data is smaller than the threshold, the metadata server returns the user data to the file switch (235). In some embodiments, the user data is cached in the file switch to be processed according to subsequent client requests. Otherwise, the metadata server returns information identifying those storage servers hosting the user data (240). The file switch, in response to a subsequent file read/write request from the client, visits (i.e., sends requests to) the identified storage servers to retrieve one or more of the user data stripe fragments (243, 247).

In some embodiments, in response to at least some types of client requests the file switch processes the user data in accordance with the client request (250). In other embodiments, or in response to other types of client requests, the file switch delivers the user data to the requesting client computer through the network, waits for the client computer to apply operations to the user data, and then receives the processed user data from the client computer. The processing of the user data at the client or file switch, or both, may modify, replace or append data to the user data.

Depending on the size of the processed user data, it may or may not be desirable to store it in the metadata server. Therefore, the file switch needs to identify an appropriate location in the aggregated file system to store the processed user data.

In some embodiments, the file switch checks if a predetermined condition is met or not (260). If the user data is retrieved from a metadata server previously and the size of the processed (i.e., new or modified) user data is still below the predefined threshold, the processed user data is then sent back to the same metadata server, which overwrites the old copy therein with the processed user data (265). In other words, a user file that remains small after the process stays in the metadata server to facilitate efficient access.

Otherwise, the processed user data is stored in a storage server (270). Note that this scenario includes three sub-scenarios:

- the user data is retrieved from a metadata server, and after the user data has been processed (e.g., by the file switch or client), the size of the processed user data is now above the predefined threshold;
- the user data is retrieved from storage servers, and after the user data has been processed, the size of the processed user data is still above the predefined threshold; and
- the user data is retrieved from storage servers, and after the user data has been processed the size of the processed user data is below the predefined threshold.

System operations in response to the first two sub-scenarios are straightforward. As long as the file size of a user file is above the predetermined threshold, a distributed storage scheme is employed to store the user data and the metadata separately. Note that in the first sub-scenario, the metadata server is responsible for updating the user file metadata with information about its newly designated hosting storage servers (at which the user data is now stored) so that a subsequent file switch operation will be able to determine where to retrieve the updated user data.

In contrast, the last sub-scenario requires special treatment. This sub-scenario occurs when the user data size of a user file that was above the threshold level now drops below that level, e.g., due to operations at a client or requested by a client. In some embodiments, since the user file has demonstrated a capability beyond the predetermined threshold associated with small-size files, the file is not treated as a small-size file despite its current small size, and its user data remains in the storage servers.

In an alternative embodiment, the user data is stored in a metadata server whenever its current size is below the predetermined threshold and is stored in the storage servers otherwise. This scheme may improve the throughput of the file system. However, if the user data size frequently moves above and below the threshold level, the benefit of a higher throughput may be outweighed by the cost of managing the transitions between the two user data storage regimes (i.e., transitions between a metadata server and the storage servers). In some embodiments, a system administrator is given an option of choosing a storage scheme for a user file based on its client access characteristics, e.g., how often a client updates the user data and the typical magnitude of user data update.

In each scenario, the metadata server updates the metadata associated with the user file to reference the user data at its current location (280). Information about the size of the user data may also be updated if the size of the file's user data has changed. Finally, the file switch sends a response to the client computer, notifying it that its requested operation has been completed (285).

In some embodiments, the predetermined threshold is the same for all the user files in the aggregated file system. In some embodiments, the threshold is configurable by a system administrator. In some other embodiments, different types of user files are associated with different thresholds. These thresholds may be determined in accordance with the client access characteristics associated with the different types of user files. For example, a user file (or user files of a particular type) which has a high client access rate (e.g., above a pre-defined access rate threshold) should be assigned a threshold value higher than that associated with a user file with a lower client access rate. As a result, the user data of a user file having a high client access rate is kept in a metadata server (along with its metadata) unless its size exceeds a second, higher predefined threshold, thereby improving the system's throughput.

After updating the user data of a user file and sending it back to the aggregated file system, a client computer may require a completion response from the system in order to proceed to next operation. In some embodiments, since different user files may have different requirements about data integrity, the file system may choose different moments of a client access transaction to respond in accordance with a predetermined write policy. For example, if the client computer submits a file write request that indicates, or is associated with a high data integrity requirement, a write-through I/O completion response is signaled only after the user data and metadata have been completely stored in the file system. On the other hand, if the client computer submits a file write request that indicates, or is associated with a lower data integrity requirement (which may be designated as the normal or default data integrity requirement in some embodiments), a write-back I/O completion response is signaled when the file switch receives the user data from the client computer. In the context of the process represented by FIG. 2, the latter option requires that the file switch notify the client computer of a completion of processing the user data before storing it in a metadata or storage server. In other words, step 285 of FIG. 2 would occur after step 250 but ahead of step 260.

A risk associated with the write-back I/O completion is that the metadata and/or user data of a user file may be lost when a system failure occurs before the data is completely written into a metadata or storage server, resulting in a corrupted file system. In contrast, the risk associated with the write-through I/O completion is significantly lower because the data has already been completely stored in a server upon the invocation of the option.

System Architecture

Figure 3:
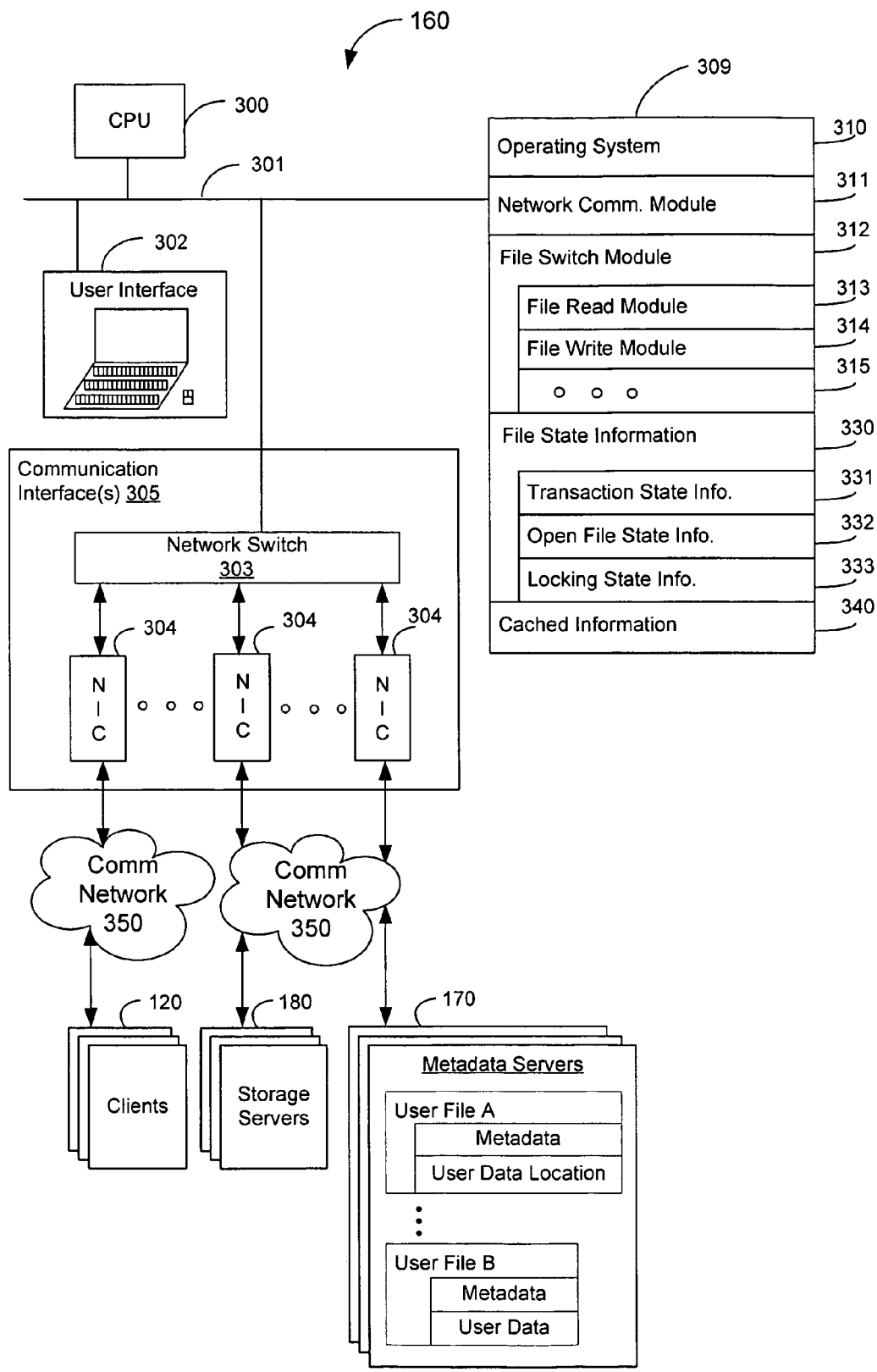
FIG. 3 is a schematic diagram illustrating a file switch of the aggregated file system that is implemented using a computer system according to some embodiments of the present invention.

In some embodiments, a file switch 160 of the aggregated file system is implemented using a computer system schematically shown in FIG. 3. The file switch 160 includes one or more processing units (CPUs) 300, memory 309, one or more communication interfaces 305 for coupling the file switch to one or more communication networks 350, and one or more system buses 301 that interconnect these components. In one embodiment, the one or more communication interfaces 305 include network interface circuits (NIC) 304 for coupling the file switch to a network switch 303, with each of the network interface circuits 304 coupled to a respective communication network 350.

The file switch 160 may optionally have a user interface 302, although in some embodiments the file switch 160 is managed using a workstation connected to the file switch 160 via communications interface 305. In alternate embodiments, much of the functionality of the file switch may be implemented in one or more application specific integrated circuits (ASICs), thereby either eliminating the need for the CPU, or reducing the role of the CPU in the handling of file access requests initiated by clients 120. The file switch 160 may be interconnected to a plurality of clients 120, storage servers 180, and one or more metadata servers 170, by the one or more communications interfaces 305.

The memory 309 may include high speed random access memory and may also include non volatile memory, such as one or more magnetic disk storage devices. The memory 309 may include mass storage that is remotely located from the CPU(s) 300. The memory 309 stores the following elements, or a subset or superset of such elements:

- an operating system 310 that includes procedures for handling various basic system services and for performing hardware dependent tasks;
- a network communication module (or set of instructions) 311 that is used for controlling communication between the system and clients 120, storage servers 180 and metadata servers 170 via the network or communication interface circuit 304 and one or more communication networks (represented by network switch 303), such as the Internet, other wide area networks, local area networks, metropolitan area networks, or combinations of two or more of these networks;
- a file switch module (or set of instructions) 312, for implementing many of the main aspects of the aggregated file system, the file switch module 312 including a file read module 313 and a file write module 314;
- file state information 330, including transaction state information 331, open file state information 332 and locking state information 333; and
- cached information 340 for caching metadata information of one or more user files being processed by the file switch.

The file switch module 312, the state information 330 and the cached information 340 may include executable procedures, sub-modules, tables or other data structures. In other embodiments, additional or different modules and data structures may be used, and some of the modules and/or data structures listed above may not be used. More detailed descriptions of the file read module 313 and the file write module 314 have been provided above in connection with FIG. 2. For example, when handling a small-size user file, the file read module 313 and the file write module 314 need only access a metadata server to retrieve or store both the metadata and user data.

Illustratively, one of the metadata severs 170 includes information about a plurality of user files. In particular, the metadata server 170 includes metadata and user data location information for user file A. To retrieve user file A, the file switch performs two transactions, one with the metadata server in response to a file open request and the other with the one or more storage servers designated by the user data location information in response to a subsequent file read/write request. In contrast, both metadata and user data of user file B are stored in the metadata server 170. A file switch only needs to perform one transaction, with a single metadata server, to retrieve user file B in response to a file open request.

Even though the aforementioned embodiments are discussed in connection with a file switch in an aggregated file system, it will be apparent to one skilled in the art that the present invention is equally applicable to any metadata-based data storage architecture that requires a software implementation.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a user file by a file switch in an aggregated file system having at least one storage sever and at least one metadata server including at least one user file, comprising:
    retrieving, by the file switch, metadata and user data associated with the user file from a metadata server;
    processing, by the file switch, the user data and the metadata associated with the user file in accordance with a request from a client;
    storing, by the file switch, the processed metadata associated with the user file in the metadata server;
    storing, by the file switch, the processed user data associated with the user file along with the stored processed metadata at a location within the metadata server designated by a predefined rule when a size of the processed user data is smaller than a predefined threshold;
    storing, by the file switch, the processed user data at a location within a storage server separate from the metadata server designated by the predefined rule when the size of the processed user data is greater than or equal to the predefined threshold; and
    updating, by the file switch, the metadata in the metadata server to reference the user data at the designated location.

2. The method of claim 1, wherein the retrieving includes retrieving, by the file switch, the metadata and user data in response to a file open request associated with the user file.

3. The method of claim 1, further comprising, prior to said storing and updating, notifying, by the file switch, the client of a completion of processing the user data in response to the client request.

4. The method of claim 1, wherein the metadata includes a size of the user data.

5. The method of claim 4, wherein updating the metadata includes updating, by the file switch, the size of the user data in accordance with the processed user data.

6. The method of claim 1, wherein the predefined threshold associated with the user file is different from a predefined threshold associated with a different user file.

7. The method of claim 1, wherein the user data of the user file remains in the separate storage server irrespective of whether the size of the user data is smaller than the predefined threshold or not.

8. The method of claim 1 further comprising retrieving, by the file switch, the processed user data and the metadata in a single transaction in response to a file open request from the client when the processed user data and the metadata are both stored in the metadata server.

9. A file switch for use in a computer network having one or more metadata servers including at least one user file, one or more storage servers, and one or more client computers, the file switch comprising:
    at least one interface for exchanging information with the one or more metadata servers, the one or more storage servers and the one or more client computers;
    one or more processors; and
    a memory coupled to the one or more processors, the one or more processors configured to execute programmed instructions stored in the memory, the programmed instructions comprising:
        retrieving metadata and user data associated with a user file from a metadata server;
        processing the user data and the metadata associated with the user file in accordance with a request from a client computer;
        storing the processed metadata associated with the user file in the metadata server;
        storing the processed user data associated with the user file along with the stored processed metadata at a location within the metadata server designated by a predefined rule when a size of the processed user data is smaller than a predefined threshold;
        storing the processed user data at a location within a storage server separate from the metadata server designated by the predefined rule when the size of the processed user data is greater than or equal to the predefined threshold; and
        updating the metadata in the metadata server to reference the user data at the designated location.

10. The file switch of claim 9, wherein the retrieving includes retrieving the metadata and user data in response to a file open request associated with the user file.

11. The file switch of claim 9, further comprising, prior to said storing and updating, notifying the client computer of a completion of processing the user file in response to the request.

12. The file switch of claim 9, wherein the metadata includes a size of the user data.

13. The file switch of claim 9, wherein the predefined threshold of the user file is different from a predefined threshold of a different user file.

14. The file switch of claim 9, wherein the user data of the user file remains in the separate storage server irrespective of whether the size of the user data is smaller than the predefined threshold or not.

15. The file switch of claim 9 further comprising retrieving the processed user data and the metadata in a single transaction in response to a file open request from the client computer when the processed user data and the metadata are both stored in the metadata server.

16. A non-transitory computer readable medium having stored thereon instructions for processing a user file by a file switch in an aggregated file system having at least one storage sever and at least one metadata server including at least one user file, comprising machine executable code which when executed by at least one processor, causes the processor to perform steps comprising:
    retrieving metadata and user data associated with the user file from a metadata server;
    processing the user data and the metadata associated with the user file in accordance with a request from a client;

storing the processed metadata associated with the user file in the metadata server;

storing the processed user data associated with the user file along with the stored processed metadata at a location within the metadata server designated by a predefined rule when a size of the processed user data is smaller than a predefined threshold;

storing the processed user data at a location within a storage server separate from the metadata server designated by the predefined rule when the size of the processed user data is greater than or equal to the predefined threshold; and updating the metadata in the metadata server to reference the user data at the designated location.

17. The medium as set forth in claim 16 wherein the retrieving includes retrieving, by the file switch, the metadata and user data in response to a file open request associated with the user file.

18. The medium as set forth in claim 16 further comprising, prior to said storing and updating, notifying, by the file switch, the client of a completion of processing the user data in response to the client request.

19. The medium as set forth in claim 16 wherein the metadata includes a size of the user data.

20. The medium as set forth in claim 19 wherein updating the metadata includes updating, by the file switch, the size of the user data in accordance with the processed user data.

21. The medium as set forth in claim 16 wherein the predefined threshold associated with the user file is different from a predefined threshold associated with a different user file.

22. The medium as set forth in claim 16 wherein the user data of the user file remains in the separate storage server irrespective of whether the size of the user data is smaller than the predefined threshold or not.

* * * * *